US009659455B2

(12) United States Patent
Watkins

(10) Patent No.: US 9,659,455 B2
(45) Date of Patent: May 23, 2017

(54) GAMES WITH PERSISTENT EFFECTS IN PLAYER PICK ROUNDS

(71) Applicant: EVERI GAMES INC., Austin, TX (US)

(72) Inventor: Brian Alexander Watkins, Austin, TX (US)

(73) Assignee: Everi Games Inc., Austin, TX (US)

( * ) Notice: Subject to any disclaimer, the term of this patent is extended or adjusted under 35 U.S.C. 154(b) by 304 days.

(21) Appl. No.: 14/311,982

(22) Filed: Jun. 23, 2014

(65) Prior Publication Data

US 2015/0371488 A1 Dec. 24, 2015

(51) Int. Cl.

| | |
|---|---|
| ***A63F 13/10*** | (2006.01) |
| ***G07F 17/32*** | (2006.01) |
| *G07F 17/34* | (2006.01) |

(52) U.S. Cl.

CPC ............ *G07F 17/326* (2013.01); *G07F 17/34* (2013.01)

(58) Field of Classification Search

USPC ...................................................... 463/20, 30

See application file for complete search history.

(56) References Cited

U.S. PATENT DOCUMENTS

| | | | | |
|---|---|---|---|---|
| 7,770,892 B2 * | 8/2010 | Seelig | ................. | G07F 17/3202 273/138.2 |
| 2007/0243923 A1 * | 10/2007 | Seelig | ..................... | G07F 17/32 463/16 |
| 2009/0005151 A1 * | 1/2009 | Seelig | ..................... | G07F 17/32 463/20 |
| 2009/0082086 A1 * | 3/2009 | Seelig | ................. | G07F 17/3244 463/20 |

* cited by examiner

*Primary Examiner* — Pierre E Elisca

(74) *Attorney, Agent, or Firm* — Nathan Calvert, Esq.; Russell D. Culbertson, Esq.; JP Cody, Esq.

(57) ABSTRACT

A slot machine game feature provides for several types of persistent indicias in a player selection round. One type of persistent indicia can result not only awards an initial credit value when picked, like a regular pick result, but also have a persistent effect in the bonus round which continues to award another randomly-generated credit value in conjunction with each remaining or subsequent pick that the player makes in the bonus. Some versions include cumulative persistent effects, where multiple picks may uncover persistent prize features. Other persistent indicia cause other effects that persist through the player selection round.

18 Claims, 14 Drawing Sheets

GAMES WITH PERSISTENT EFFECTS IN PLAYER PICK ROUNDS

TECHNICAL FIELD OF THE INVENTION

The invention relates to methods for conducting an interactive reel or symbol array type wagering game including a player pick type round in which players select symbols that may have persistent effects.

BACKGROUND OF THE INVENTION

Various slot machine games are known that provide wagering games in a variety of ways. Within the slot machine field, some games use a player selection round in which a player is prompted to select from multiple options, which typically reveal prizes or indicia that must be matched to other indicia to win a prize. Player selection rounds are typically conducted as a free bonus round but may be integrated somehow into the base wagering game provided by a slot machine. The player selection rounds are typically activated by a trigger of some kind, and end after a fixed number of player picks, or after a certain "game ending" symbol is uncovered.

What is needed are more exciting variations for the creation and use of symbol enhancements in order to increase player excitement and enjoyment of slot machine games.

SUMMARY OF THE INVENTION

The present invention includes a highly entertaining method of conducting a game for one or more players. A slot machine game feature provides for several types of persistent indicia or symbols in a player selection round. When uncovered, these indicia stay active in the player selection round, with persisting effects that are displayed to the player and used in the game rules. The first type of persistent indicia result not only awards an initial credit value when picked, like a regular pick result, but also has a persistent effect in the bonus round which continues to award another randomly-generated credit value in conjunction with each remaining or subsequent pick that the player makes in the bonus. Some versions include cumulative persistent effects, where multiple picks may uncover persistent prize features. A second type of persistent indicia delays the end of the selection round by delaying or interrupting a series of escalating events that eventually end the round. A third type of persistent indicia guarantees another bonus award at the end of the round. Other types of persistent indicia may be used, and the features described herein are preferably used together for greater entertainment value in a slot machine game.

Another version of the invention is a computer program stored on a non-transitory readable medium. The software version is, of course, typically designed to be executed by a gaming machine or networked gaming system. The software includes multiple portions of computer executable code referred to as program code. Gaming results are provided in response to a wager and displayed by display program code that generates simulated slot reels each including one or more symbol locations. The program also has game controller program code for determining game play results involving spins or other randomization of an array of symbols, each spin producing a spin result, and providing the player selection round.

Another version of the invention is a gaming system that includes one or more gaming servers, and a group of electronic gaming machines connected to the servers by a network. The various functionality described herein may be distributed between the electronic gaming machines and the gaming servers in any practically functional way. For example, the current preferred architecture is for the servers to determine all aspects of game logic, random number generation, and prize awards. The gaming machines provide functionality of interfacing with the player and animating the game results received from the server in an entertaining manner. However, other embodiments might use a thin client architecture in which the animation is also conducted by the server, and electronic gaming machines serve merely as a terminal to receive button or touch screen input from the player and to display graphics received from the server.

Different features may be included in different versions of the invention. For example, different animation themes may be applied that display the application of the persistent indicia in different ways. These and other advantages and features of the invention will be apparent from the following description of the preferred embodiments, considered along with the accompanying drawings.

DETAILED DESCRIPTION OF PREFERRED EMBODIMENTS

Figure 1A:
FIGS. 1A-K are game screen diagrams showing various features of a player selection round according to one embodiment.

FIGS. 1A-K are game screen diagrams showing various features of a player selection round according to one embodiment. FIG. 1A shows the opening screen of a player selection round, which contains instructions to play the round along with an explanation of three types of persistent indicia that may be revealed in the player selection round. Preferably the player selection round is played as a bonus round activated by a suitable trigger in a base game.

Figure 1B:
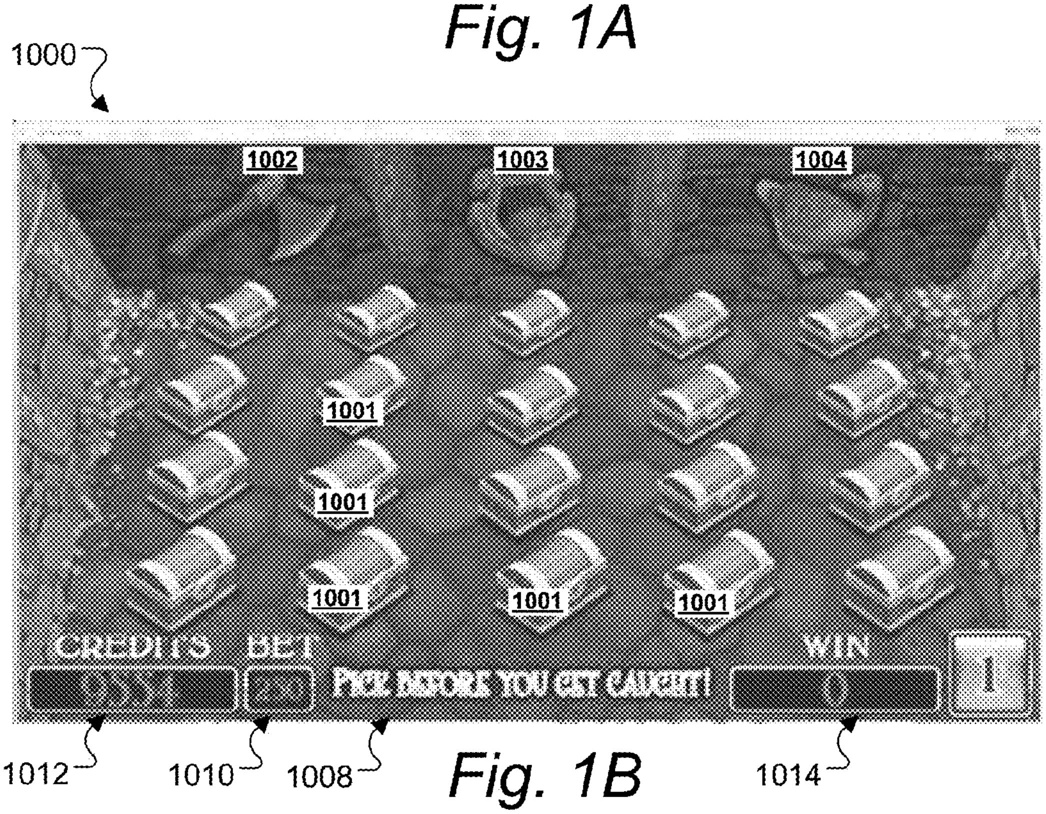

After the instruction screen of FIG. 1A, an intro animation may occur, after which the game proceeds to the example game screen diagram 1000 depicted in FIG. 1B. The display 1000 of FIG. 1B depicts the interface for the player selection round, which may be presented as part of a game provided through various gaming machines 100 shown in FIG. 4A. In this embodiment, the graphic display includes a matrix of selectable indicia 1001, in this game theme presented as treasure chests, which when selected by the player reveal their underlying prize indicia or persistent indicia as further described below. Above the matrix of selectable indicia are shown three persistent indicator locations, each one for indicating whether a particular type of persistent indicia is currently active in the game. The graphic display 1000 also includes a message area 1008 for displaying prompts or other messages regarding the game's progression. A group of accounting indicators at the edge displays various pieces of data such as the current wager box 1010, available credits 1012, and payouts 1014. There may also be other gaming information shown on display 1000 or on a secondary electronic display such as the secondary video display device 107 positioned above the primary video display device of the gaming machine shown in FIG. 3. This may display prize tables, progressive prize data, or other data suitable to the game.

In this variation, embodied in Multimedia Games® slot game entitled "Jack and the Beanstalk," five four-symbol multisymbol reels are used in the base game. Twenty unisymbol reels may also be used instead. The player pick bonus round shown in FIGS. 1A-K is known as the Beanstalk Bonus. In this implementation, scattered magic bean symbols on reels 1, 3, and 5 triggers the Beanstalk Bonus. Generally the bonus round proceeds as follows—the intro shows the character Jack ascending the beanstalk, and the bonus picks take place in an animated giant's lair, where there is a grid of selectable indicia, treasure chests 1001. In this embodiment, the player gets an indeterminate number of picks. There is a sequence of three escalating signs of the giant's approach (treasure chests shaking, audio including "fee-fi-fo-fum"), each one appearing after a pick at random intervals, the third one ending the bonus. These are called escalating end events below in the description. The player selection round includes multiple symbols representing credit values for pick prizes (symbols such as gold and jewels). There are also three persistent pick indicia available, which are described separately with respect to the flowcharts of FIGS. 2B-D. The first type of persistent indicia, implemented here as a "goose that lays golden eggs" persistent indicia (1007 in FIG. 1D), is further described with respect to FIG. 2B. This feature pays a credit value, and then pays an additional random credit value (depicted as laying a golden egg) in conjunction with every subsequent pick the player makes Further, if the first type indicia, the goose, is already active, it will pay a persistent prize ("lay an egg") when the second type persistent indicia is selected, even though that indicia itself does not pay a pick prize. The first type indicia will also pay a persistent prize if it is active when the third type indicia (the harp) is selected, again even though the harp does not have a pick prize awarded on its own when selected. The second type persistent indicia, an axe (1005 in FIG. 1H), is kept throughout the player pick round and awards credit value as part of the bonus outro or exit sequence. If the axe is found during the bonus, the outro shows Jack chopping down the beanstalk and killing the giant, along with awarding the extra prize. Otherwise, the outro shows Jack escaping down the beanstalk. The third type of persistent indicia, a harp, puts the giant to sleep for a random number of turns, delaying the escalating events that cause the end of the player selection round, in this version symbolized by the giant's arrival.

Figure 1C:
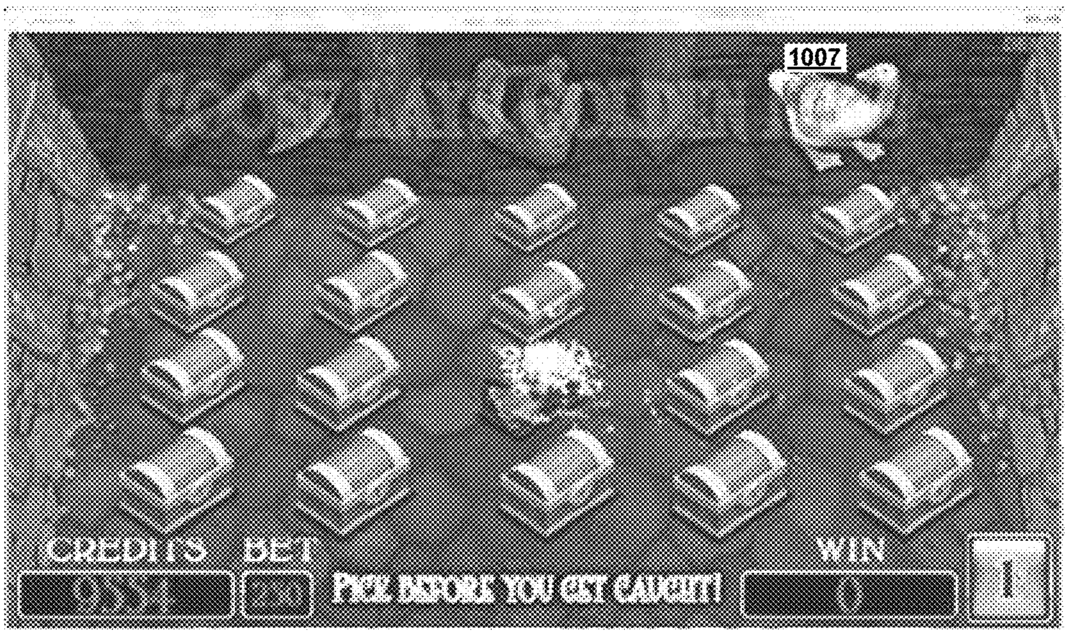
Figure 1D:

FIG. 1C shows a game screen diagram immediately after the player has made their first selection. In this case, the selection revealed a first type of persistent indicia 1007, in this game theme a "goose that lays golden eggs," is shown occupying the indicator location 1004 (FIG. 1B) after the player makes their selection. The goose symbol is brighter than the placeholder symbol of indicator location 1004, which is a graphic indicator meaning to the player that the indicia is active. The functionality of this and other persistent indicators is further described with respect to the game process flow charts below. FIG. 1D shows the result of another player selection, while a first type indicia 1007 is still active. A golden egg and sparkles are shown connecting the persistent indicator 1007 to a secondary prize awarded in addition to the pick prize award for the player's selection. Because the first type persistent indicia, the goose, is active, each player selection results in two prizes; an original pick prize, such as the 1000 credits shown FIG. 1D (center), and the prize resulting from the golden egg animation, in this instance the 2500 credit prize shown above the original 1000 credit prize.

Figure 1E:
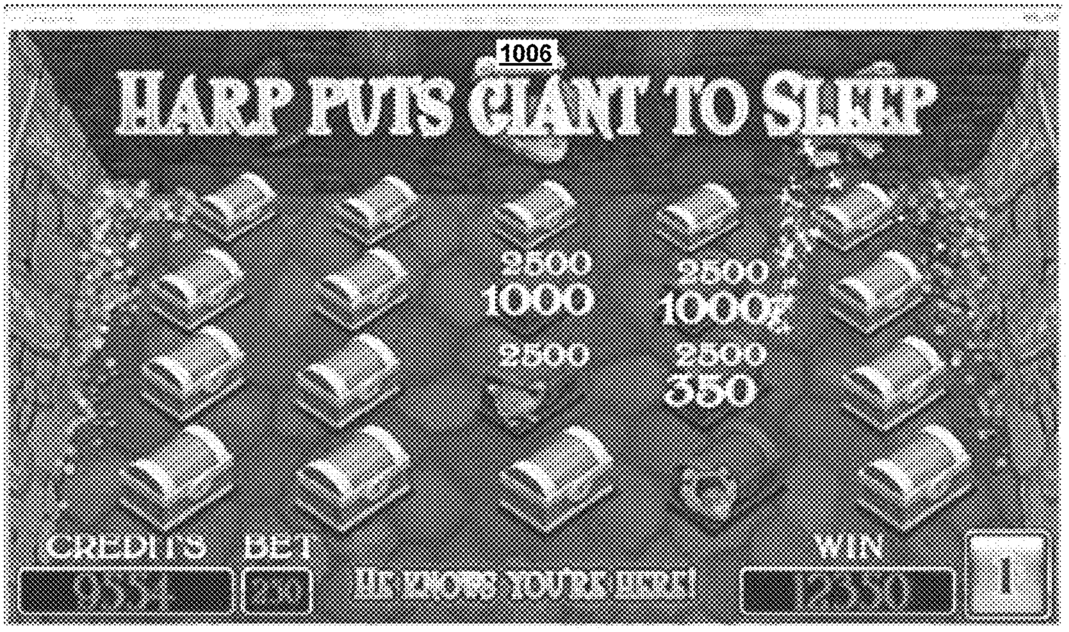
Figure 1F:
Figure 1G:

FIG. 1E and FIG. 1F show the use of another type of persistent indicia, described below in the flowchart discussion as the third type persistent indicia. This indicia is represented in this game theme as the harp 1006 which puts the giant to sleep, and is accompanied by the player messages shown in FIGS. 1E-G. Third type persistent indicia 1006 persists for a limited time during the player selection round to prevent escalating events that eventually end the round, after which the escalating events resume at random intervals (the giant wakes up and continues his approach, as relayed in the messages of FIG. 1G). This persistent indicia is further described with respect to FIG. 2D.

Figure 1H:

FIG. 1H shows another type of persistent indicia, described below as the second type persistent indicia, which is embodied in the indicator 1005 as an axe.

Figure 1I:
Figure 1J:
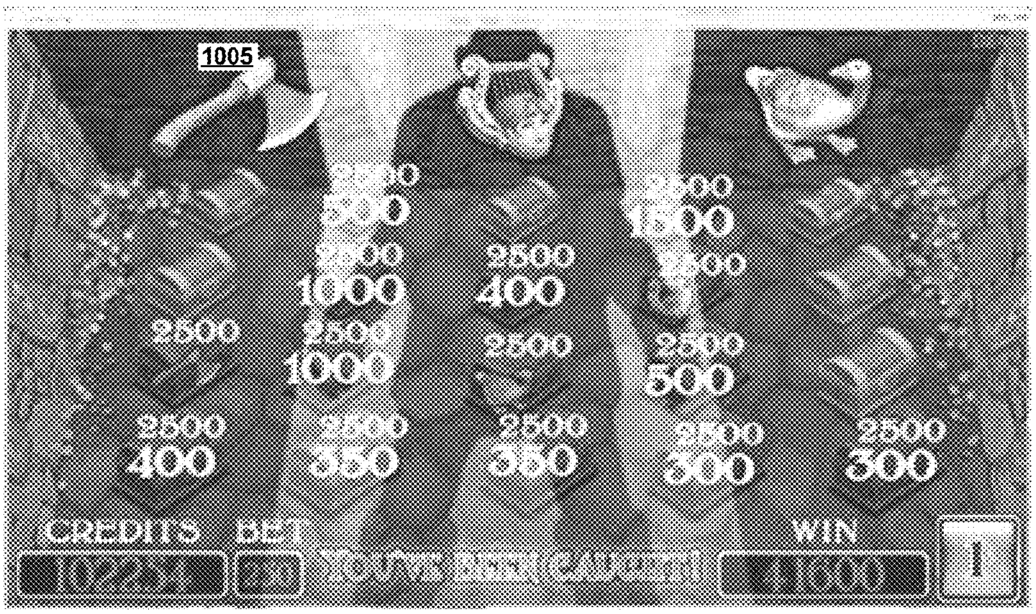
Figure 1K:

FIGS. 1I-K show a sequence that ends the player selection round. In this version, the game ends with the third escalating end event, which is the arrival of the giant shown in FIG. 1J. The outro animation sequence will vary if the second type persistent indicia has been found as shown in FIG. 1K by the persistent indicator of the axe 1005. In this case, the outro awards an extra prize from the second type persistent indicia, the axe 1005.

Figure 2A:
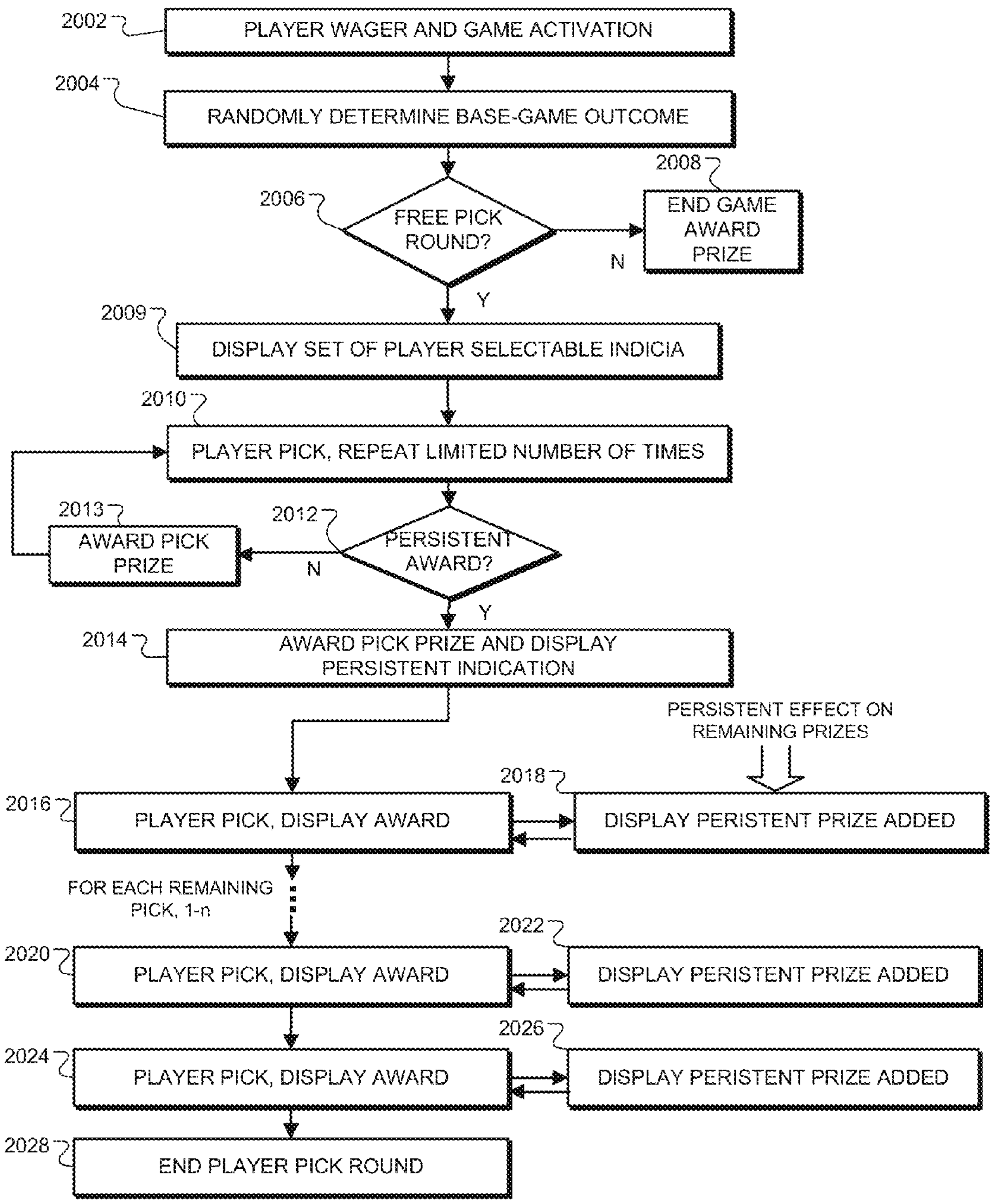
FIG. 2A is a flow chart showing the general method of play including persistent indicia according to various embodiments.

FIG. 2A is a flow chart showing the general method of play for an example player pick round according to one embodiment of the invention. The depicted method preferably takes place in the context of a free pick bonus round activated in a base game outcome as shown at step 2004 and 2006, but may also be employed in the context of a base game round or secondary bonus game. To begin a game play, the method receives a wager from the game player at step 2002, which typically consists of some input from the player to set the amount to be wagered from their credit amount on the machine. This step may also be carried over from previous game rounds by simply starting the game with the previous wager amount set. Then, the method receives a play input from the player. This typically happens through a 'Play' button on the game cabinet or touchscreen display, and serves to place the wager and start a single round of game play in the base game. In embodiments having reels, reel displays, or simulated reels, this is conducted by spinning the reels. Other embodiments may otherwise rearrange or randomize the symbols on the matrix in any suitable manner After the game activation in step 2002, the method randomly determines the game outcome, preferably by randomly determining a set of reel stops that determine which symbols fill the matrix for the current game outcome at step 2004. For games that use other scrambling besides simulated reels, the random outcome is determined at this step as appropriate for the game. The preferred version generates at least one random number and uses the at least one random number to determine a set of game reel stops specifying a position in which multiple simulated or mechanical reels will stop to display symbols in a symbol array in a spin outcome for the wager.

In the embodiment of FIG. 2A, there is a combination of bonus symbols that activates a player free pick round at step 2006. Other methods may activate the round as a mystery bonus or another suitable activation method. If the free pick round is activated, the method awards any prize won in the base game and then goes to step 2009 where the free pick round is begun by displaying the set of player selectable indicia. If, back at step 2006, there is no free pick round activated, the method continues to play out the base game at step 2008, which may involve activating other bonus features or special features.

Generally referring to the player pick round (or "player selection round") beginning at step 2009, the number of picks in the round may be fixed or variable, depending on implementation. The depicted version in FIG. 2A has a fixed number of picks, but other versions such as those depicted in FIGS. 2B-2D have variable length rounds that end according to features occurring in response to the player picks. In the version of FIG. 1A, a player pick is provided at step 2010, which is repeated a limited number of times in the round. Each player pick, at step 2010, may contain a normal pick award or may contain a persistent award. The process checks for a persistent award at step 2012, and if one is found it proceeds to step 2014 where it awards a pick prize and displays a persistent indication on the electronic display, meaning that a persistent effect will be applied to future prizes in the player pick round. If no persistent award is found by the player pick at step 2012, the process awards a pick prize at step 2013, and proceeds back to step 2010 to allow the player to pick their next selection. A limited number of selections are provided at step 2010. The number may be fixed, or may be variable by a suitable algorithm such as by a designated number of winning picks, a designated prize amount won, a specific item revealed in a pick, or any other suitable method of ending a player pick round.

Referring again to step 2014 where the process begins to implement the persistent effect according to the invention, the persistent indication shown on the electronic display effects each future pick made by the player, in preferred versions until the end of the player pick round, but in other versions the effect may persist for a shorter time such as a fixed number of picks, or until a designated item is revealed in a pick. As shown at step 2016, the next player pick is awarded a prize, to which is added an additional persistent prize shown at step 2018, which is shown on the display as being caused by or related to the persistent indicia already uncovered and displayed. This process is repeated for each remaining pick in the player pick round as indicated by step 2020, where the player makes another selection and is awarded both a player pick award and a persistent award added at step 2022, with a similar repetition of the player pick at step 2024 awarding a pick prize and the persistent prize added at step 2026, again displayed as being a result of the persistent indicia shown on the screen. At step 2028, the selection round ends, and the process moves onto the next game round.

In the depicted flowchart, only one persistent indicia is uncovered in the player pick round, however different versions may include multiple persistent indicia to be uncovered in a single player pick round. In such case, each indicia uncovered is shown on the display and provides its own persistent award to be added to every future player pick award achieved in the round. Further, while a single type of persistent indicia is described here, other versions have multiple types of indicia that provide other affects besides merely adding a prize to each future player pick prize achieved in the player pick round. Some example types of persistent indicia are described below.

Figure 2B:
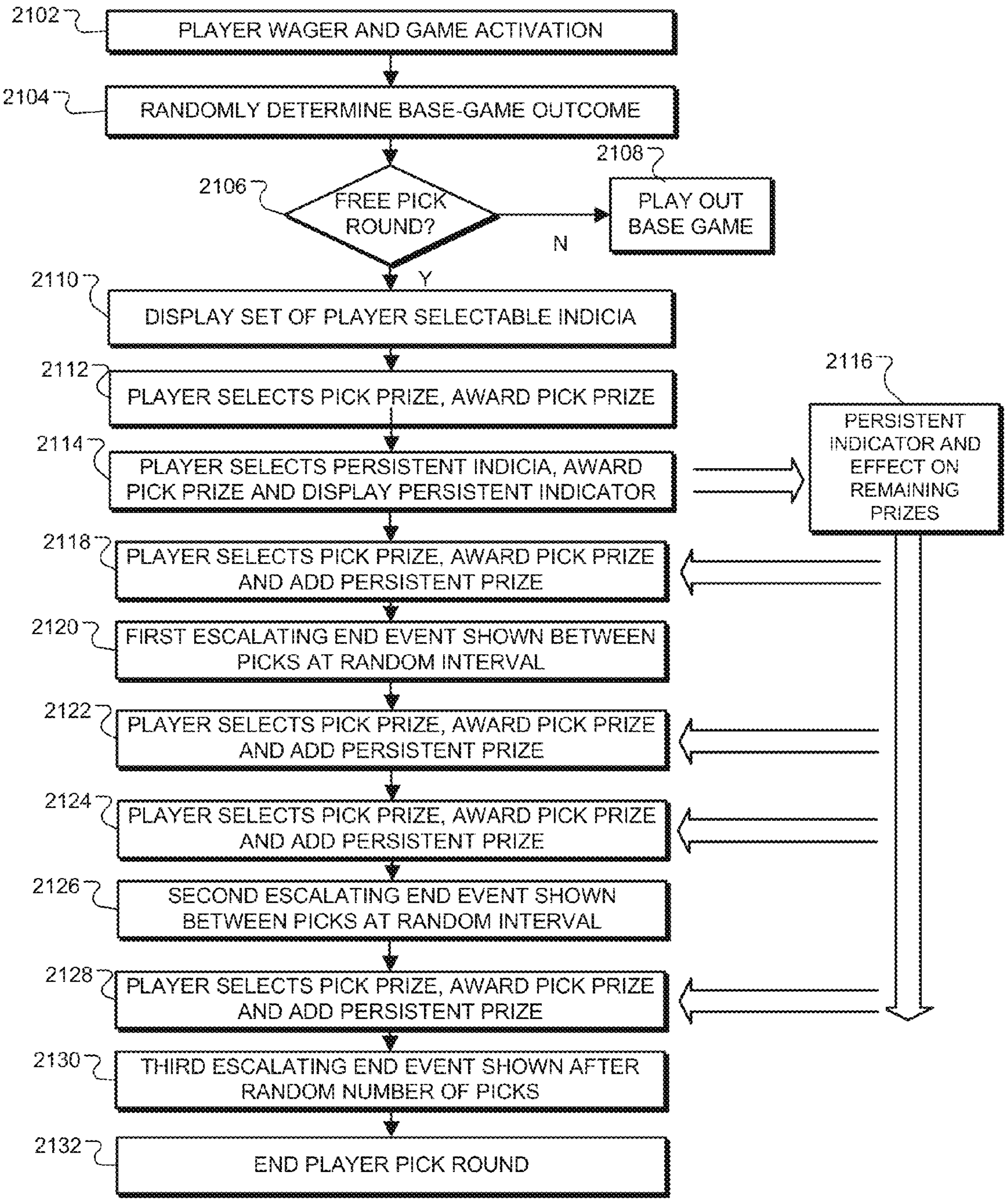
FIG. 2B is a flow chart showing a game method using a persistent indicia feature according to another embodiment.

FIG. 2B is a flow chart showing a game method using a persistent indicia feature according to the preferred embodiment used in the Jack and the Beanstalk game described above. As discussed above, the player pick round includes a sequence of three escalating signs of the giant's approach, each one appearing at a random time between picks, the third one ending the bonus. These are depicted at steps 2120, 2126, and 2130.

Referring in more detail to FIG. 2B, the player selection round is begun similarly to that of the previous flowchart, with the player wager and game activation at step 2102 and a random determination of the game outcome at step 2104. If the player selection free pick round activation is found at step 2106, the process goes to step 2110 where it displays the player selectable indicia. The example sequence of events depicted in the flowchart is one example of how such a player selection round might proceed, in order to explain the functioning of the first persistent indicator. Therefore, while a certain number of player picks and prizes are shown in this example sequence, this is not limiting and the game may follow other scenarios according to the rules. As shown at step 2112, in this example game play sequence, the player selects a pick prize preferably by touching the indicia on the screen, which is then animated to reveal a hidden indicia and provide a related pick prize. Next, at step 2114, the player makes another selection, which uncovers a persistent indicia. The process awards a pick prize for the indicia, and also displays a persistent indicator such as those described above with respect to FIG. 1A, and as indicated at step 2116 this persistent indicator is shown to remain on the screen and affect the remaining prizes in the player selection round. The broad arrows under box 2116 show the steps at which the persistent indicator has an effect on prizes in the selection round. Referring again to step 2114, after the player uncovers the persistent indicia, the process goes to the next player pick at step 2118 where the player selects a location revealing one of the pick prizes, which is awarded to the player along with an added persistent prize shown to be caused by the persistent indicator as depicted by the arrow acting on step 2118. Preferably, the amount of the added persistent prize is randomly determined within a range using a new random number generation. However, other versions may use a fixed prize, or nonrandom selection from a fixed set of prizes. Some versions may also link the amount of the persistent prize to the amount of the pick prize, such as by applying a multiplier, or applying a fixed value persistent prize for each different type of pick prize indicia that may be revealed by the player selections.

After the credit award at step 2118 is complete, in this example sequence the process randomly determines that the first escalating end event will now occur at step 2120. This is shown on the display by animation preferably accompanied by sound, such as the warning of the Giant's approach discussed above with respect to the Jack and the Beanstalk theme, in which the display is shown to shake, and the audio system plays a rumble and the Giant's voice saying "fee-fie-foe-fum." In this version, the escalating end events each occur after a random number of player picks, but in other versions the events may of course be distributed throughout the player selection round in other ways in order to guarantee the round ends at a point suitable for the game mathematics. For example, the entire length of the player selection round may be determined randomly, and the escalating end events may be distributed appropriately within the player selection round. In other versions, as allowed in the particular gaming regulations for some jurisdictions, the total award for the round may be randomly selected or predetermined, and a scripted set of events for the player selection round may be provided, reverse mapped to achieve the desired outcome. However, in the preferred version, the player selection round is a true selection round in which the indicia are hidden and revealed by player selections, and the escalating end events are placed randomly in the round as described.

Next at step 2122, the player selects another location and is awarded a pick prize along with another persistent prize due to the persistent indicator from box 2116. In this sequence, the next player selection at step 2124 also results in a pick prize and an added persistent prize. Again, this is merely an example sequence, and the game will proceed according to the player selections and game rules in any particular instance of the game. In this sequence, the game randomly determines that the second escalating end event will next occur, and this is shown at step 2126. Next at step 2128, the player makes another selection which reveals a pick prize, and again a persistent prize is added to the revealed prize. Finally, at step 2130, next the process determines that the third escalating event will occur, which in this version ends the player selection bonus round at step 2132, with the arrival of the giant as described above.

Figure 2C:
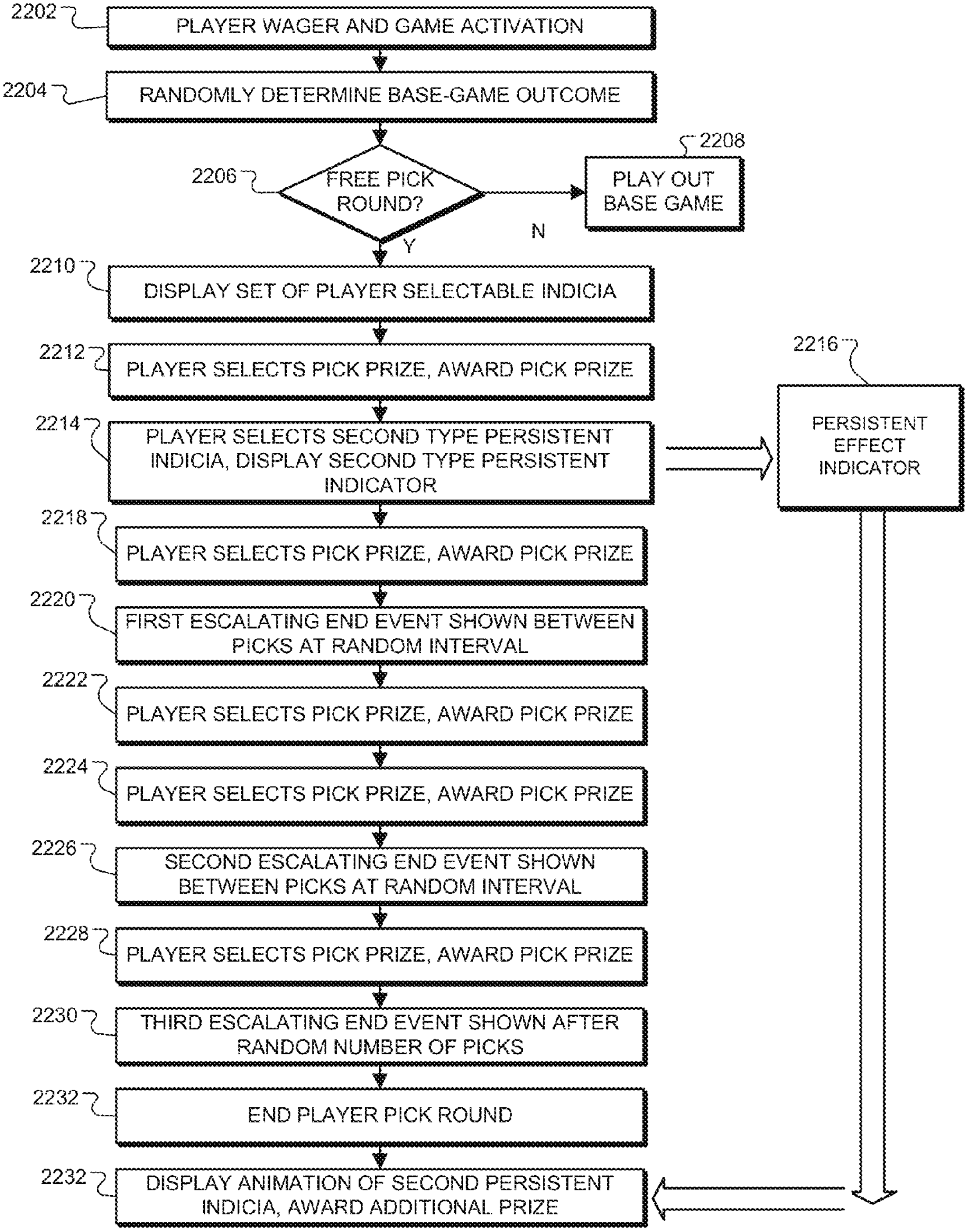
FIG. 2C is a flow chart showing the use of another type of persistent indicia.

FIG. 2C shows a flow chart of an embodiment that uses a persistent indicia of a second type that has a persistent effect applied at the end of the player selection round. The depicted process begins with the wager and base game outcome like the previous process. This example player selection round begins at step 2210. Again, the depicted steps employ a second type persistent indicia. While this type of indicia is described separately from the first type described above, these features may be used together in a single embodiment and, in fact, are used together and interact in the preferred embodiment described above.

As shown at step 2212, the player begins selecting from the set of available indicia by touching the indicia on the screen, which is then animated to reveal a hidden indicia and provides a related pick prize. Next, at step 2214, the player makes another selection, which uncovers a persistent indicia of the second type. However, unlike the first type of persistent indicia, this indicia results in the indicator remaining on the screen for the remainder of the player selection round, but does not award any further prizes until the end of the round. This is shown in the flowchart by the arrow shown leaving box 2216 and indicating that the persistent effect is applied in the process a step 2232, which occurs after the end of the player selection round. It should be noted that the preferred version of this second type persistent indicia is embodied in the Jack and the Beanstalk theme game described above as the axe indicia, which, once uncovered, persists on the screen until the end of the round, where a random prize is awarded along with the animation of the hero Jack chopping down the beanstalk using the axe.

Figure 2D:
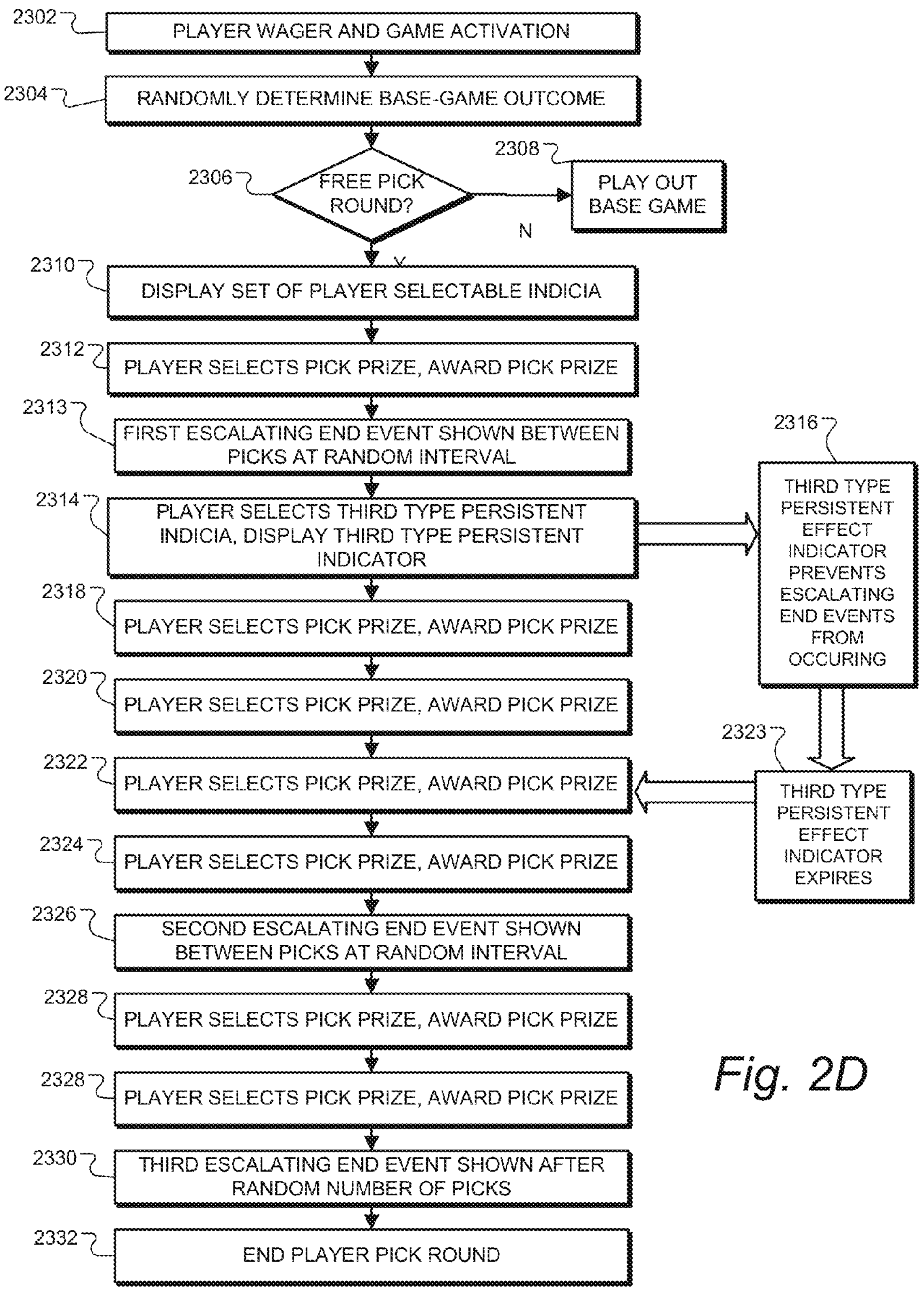
FIG. 2D is a flow chart showing the use of a third type of persistent indicia.

FIG. 2D is a flowchart of the game process containing a third type of persistent indicia according to preferred embodiments of the invention. The depicted process starts similarly to the other processes described above, and the feature herein is meant to be used in combination with the other features described above with respect to FIG. 2B and FIG. 2C. Again, the flowchart shows a scenario that a player might encounter when playing the game, and actual games will vary. As shown, the free pick round begins at step 2310, where the process shows the set of player selectable items on the screen, that when selected reveal various indicia. At step 2312, the player selects one of the items, which reveals a pick prize indicia and awards the player the related prize. Next, at step 2313, the game randomly determines that the first escalating end event occurs ager step 2312. The escalating end events, such as the signs of the approaching giant in the preferred giant-themed game, increase excitement to the player because they fear their round will soon end, and they hope to win big prizes before the end. Ager the first escalating end event at step 2313, the player selects another item which is revealed to be a third type persistent indicia. In response, the process shows the third type persistent indicator being added to the game display, where it will persist for a number player selections, but in this case not all. The third type persistent indicia has the effect, in this embodiment, of preventing any escalating end events from occurring while the third type persistent indicator is present, as indicated at box 2316 and the arrow showing that the third type persistent effect indicator persists for three player selections, and then expires at step 2323. When this indicator expires, it is removed from the display or otherwise indicated graphically to be changed. The preferred version implements the third type persistent indicator by the player selection revealing a harp, which is animated to play music which puts the giant to sleep, thereby preventing the giant from approaching and ending the round as long as the harp is playing. When the third type indicator expires, the harp music stops playing. The number of player selections that the third type indicator will last may be randomly determined, or may be predetermined The third type indicator may be revealed at any time in the round before the event that ends the player selection round. This feature increases player excitement by letting them know the player selection round definitely will not end, at least until the third type indicator expires, ager which the player selection round will progress as the remaining escalating end events occur. The player continues to select items ager the third type indicator expires, at steps 2324-2328. As the player makes their selections, the escalating end events are again provided at random intervals to advance the player selection round to its end at step 2330 where the third and final end event occurs. The player selection round then ends at step 2332. In a preferred version only one of the third type of indicator occurs in a player selection round, but other versions may allow more than one to occur.

It should be noted that the third type of indicator is preferably used together with the other two types of indicators in the same player selection round. While the third type (the harp) and the second type (the axe) in this version only occur once in a player selection round, the first type persistent indicator (the goose that lays golden eggs) can occur several times, each time providing a persistent effect that adds a separate prize to every pick prize achieved in the player selection round. The other types may also occur multiple times in other embodiments. It can therefore be understood that the combination of these features can increase player excitement and allow great variation in the gaming experience prizes awarded in a player selection round. In a particular round, a player might accumulate one or two of the first type persistent indicators, which are increasing every pick prize that the player reveals. Then the player might uncover one of the third type persistent indicia, which will extend the length of the player selection round by guaranteeing that the round does not end as long as the third type indicator persists, thereby increasing the effect of the first two persistent indicators already revealed and accumulated. Further, the accumulation of the second type of indicator will increase player excitement because they know a random prize will be awarded at the end of the round when, for example, the axe indicator is used to chop down the beanstalk. While this preferred embodiment does not award a pick prize for the second or third type indicia, but awards a persistent prize if they are selected while a first type indicia is active, other versions may award a pick prize for the second and third types of indicia as well.

Further, while the system computer executable instructions described above are preferably executed by a Class III gaming machine as further discussed below, it should be understood that this is only one example embodiment, and other versions may divide the processing tasks of the game method in a different manner For example, some systems may employ a thin client architecture in which practically all of the processing tasks are performed at the game server, and only display information for the player interface transmitted to the electronic gaming machine. In such an embodiment, only the steps involving player input or display are performed by the electronic gaming machine, with the remaining steps performed by one of the game servers in the system. In such a case, though, the software architecture is preferably designed as a thin client in which a dedicated virtual machine running on the game server (or a virtual machine server connected in the gaming network) performs the tasks designated in the present drawing as occurring "at the gaming machine." In the depicted method, the method is performed by the respective computer hardware operating under control of computer program code. While central processor arrangements may vary (for example award controllers may be integrated on the same machine with a gaming server, or may be a separate server connected on a secure network), the particular central determinant architecture is not limiting and will be referred to generally in this drawing as the game server (i.e. 302, 403). As shown at step 2002 in FIG. 2A, the method performed at the game server further includes receiving game play requests originating from electronic gaming machine 100, and sending commands to the gaming machine to show reels spinning, the player selection rounds with their persistent indicia, and results being displayed. The division of game logic steps between gaming machines and servers is known in the art and may be accomplished according to suitable methods allowed for the relevant gaming jurisdictions.

Figure 3A:
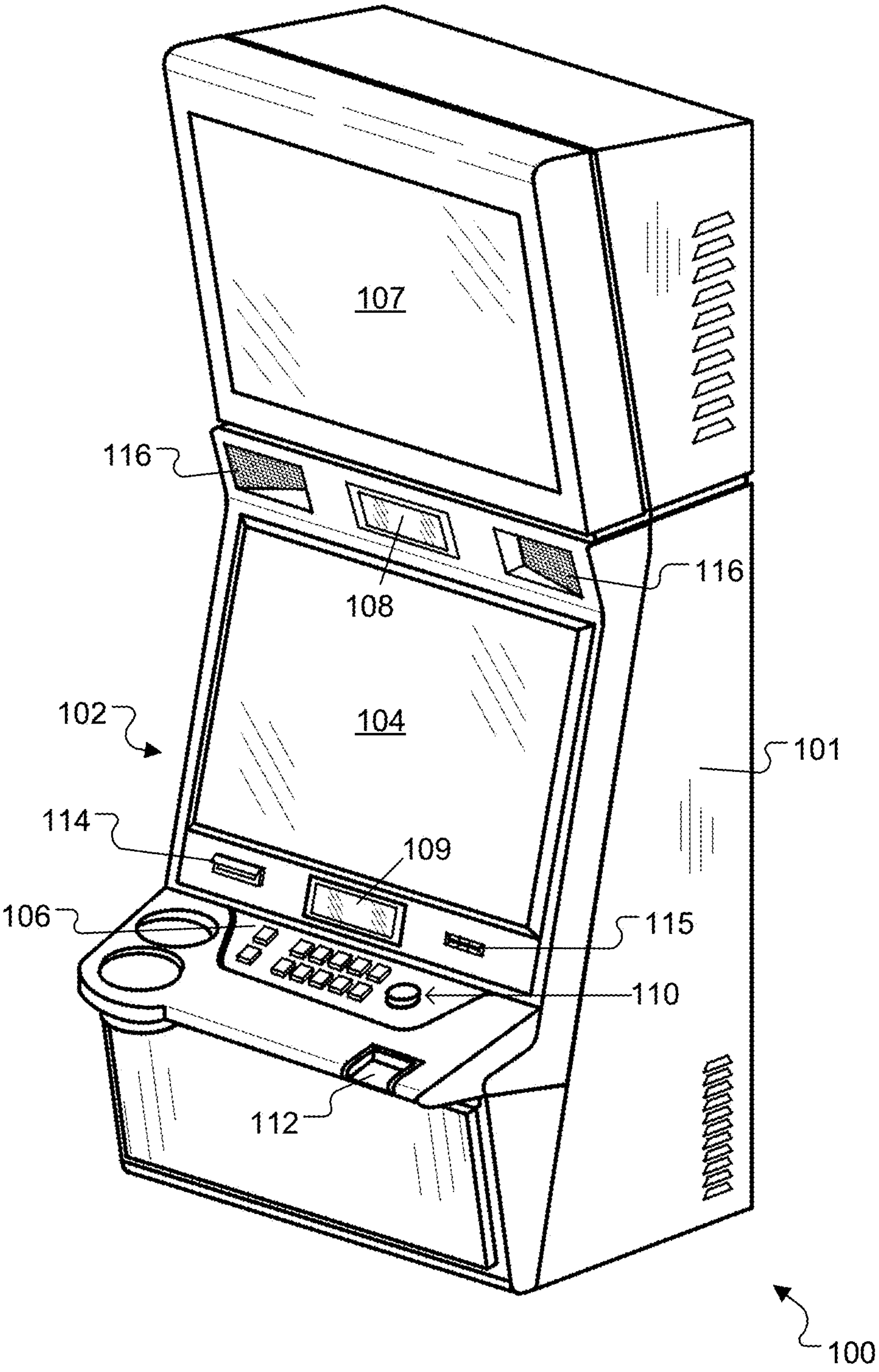
FIG. 3A is a front perspective view of a gaming machine which may be used in a gaming system embodying the principles of the present invention.
Figure 3B:
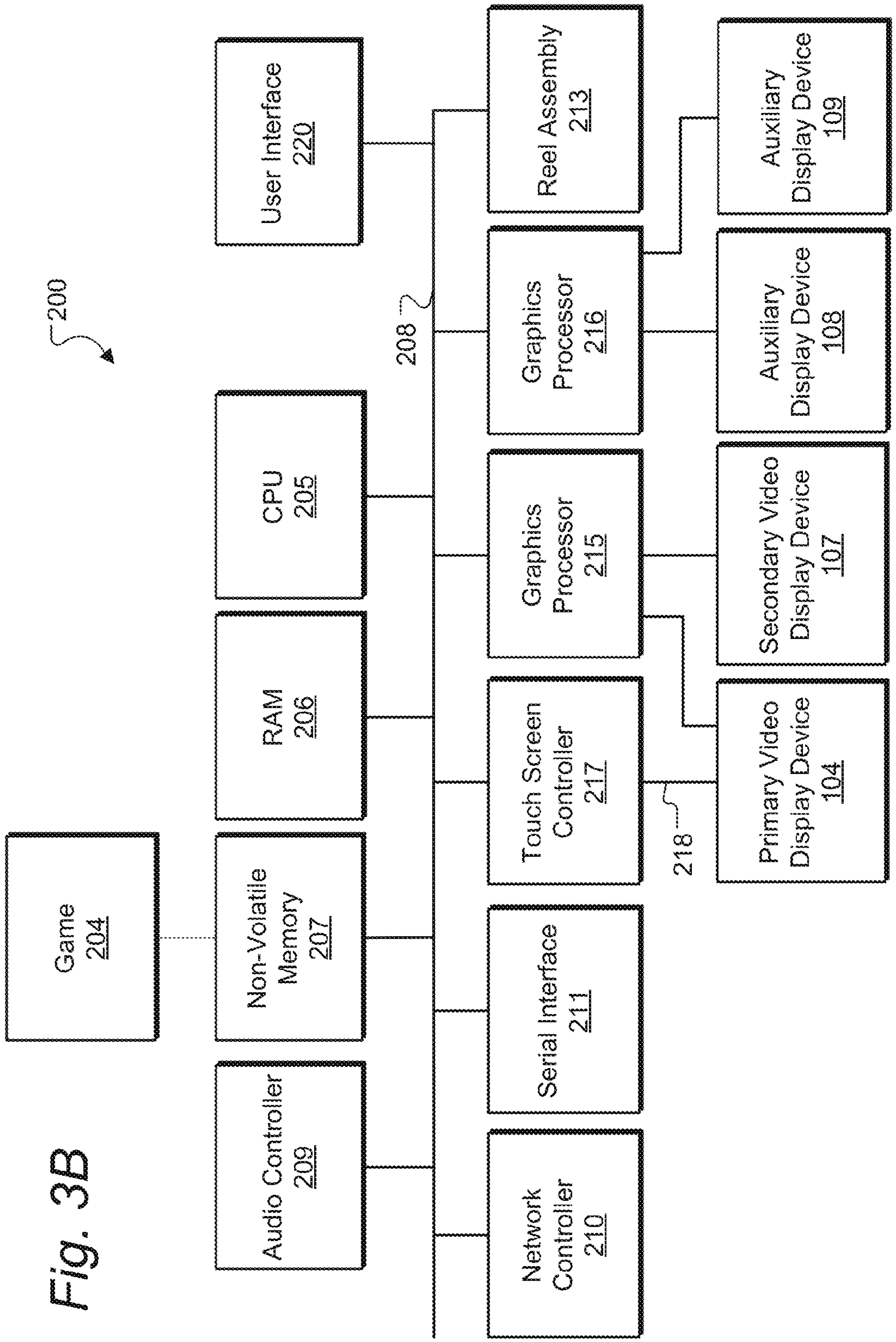
FIG. 3B is a block diagram showing various electronic components of the gaming machine shown in FIG. 3A together with additional gaming system components.

FIG. 3A shows a gaming machine 100 that may be used to implement a persistent indicia game according to the present invention. The block diagram of FIG. 3B shows further details of gaming machine 100. Referring to FIG. 3A, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that each display device referenced herein may include any suitable display device including a cathode ray tube, liquid crystal display, plasma display, LED display, or any other type of display device currently known or that may be developed in the future.

In preferred versions, the gaming machine 100 illustrated in FIG. 3A also includes a number of mechanical control buttons 110 mounted on ledge 106. These control buttons 110 may allow a player to select a bet level, select pay lines, select a type of game or game feature, and actually start a play in a primary game. Other forms of gaming machines according to the invention may include switches, joysticks, or other mechanical input devices, and/or virtual buttons and other controls implemented on a suitable touch screen video display. For example, primary video display device 104 in gaming machine 100 provides a convenient display device for implementing touch screen controls.

It will be appreciated that gaming machines may also include a number of other player interface devices in addition to devices that are considered player controls for use in playing a particular game. Gaming machine 100 also includes a currency/voucher acceptor having an input ramp 112, a player card reader having a player card input 114, and a voucher/receipt printer having a voucher/receipt output 115. Audio speakers 116 generate an audio output to enhance the user's playing experience. Numerous other types of devices may be included in gaming machines that may be used according to the present invention.

FIG. 3B shows a logical and hardware block diagram 200 of gaming machine 100 which includes a central processing unit (CPU) 205 along with random access memory 206 and nonvolatile memory or storage device 207. All of these devices are connected on a system bus 208 with an audio controller 209, a network controller 210, and a serial interface 211. A graphics processor 215 is also connected on bus 208 and is connected to drive primary video display device 104 and secondary video display device 107 (both mounted on cabinet 101 as shown in FIG. 3A). A second graphics processor 216 is also connected on bus 208 in this example to drive the auxiliary display devices 108 and 109 also shown in FIG. 3A. As shown in FIG. 3B, gaming machine 100 also includes a touch screen controller 217 connected to system bus 208. Touch screen controller 217 is also connected via signal path 218 to receive signals from a touch screen element associated with primary video display device 104. It will be appreciated that the touch screen element itself typically comprises a thin film that is secured over the display surface of primary video display device 104. The touch screen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 3B are elements commonly associated with a personal computer. These elements are preferably mounted on a standard personal computer chassis and housed in a standard personal computer housing which is itself mounted in cabinet 101 shown in FIG. 3A. Alternatively, the various electronic components may be mounted on one or more circuit boards housed within cabinet 101 without a separate enclosure such as those found in personal computers. Those familiar with data processing systems and the various data processing elements shown in FIG. 3B will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 3B as being connected directly on system bus 208 may in fact communicate with the other system components through a suitable expansion bus. Audio controller 209, for example, may be connected to the system via a PCI bus. System bus 208 is shown in FIG. 3B merely to indicate that the various components are connected in some fashion for communication with CPU 205 and is not intended to limit the invention to any particular bus architecture. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104, secondary video display device 107, and graphics processor 216 is shown for controlling both auxiliary display devices 108 and 109, it will be appreciated that CPU 205 may control all of the display devices directly without any intermediate graphics processor. The invention is not limited to any particular arrangement of processing devices for controlling the video display devices included with gaming machine 100. Also, a gaming machine implementing the present invention is not limited to any particular number of video display device or other types of display devices.

In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 either alone or in combination with graphics processor 215 may implement a presentation controller for performing functions associated with a primary game that may be available through the gaming machine and may also implement a game client for directing one or more display devices at the gaming machine to display portions of a persistent indicia player selection round according to the present invention. CPU 205 also executes software related to communications handled through network controller 210, and software related to various peripheral devices such as those connected to the system through audio controller 209, serial interface 211, and touch screen controller 217. CPU 205 may also execute software to perform accounting functions associated with game play. Random access memory 206 provides memory for use by CPU 205 in executing its various software programs while the nonvolatile memory or storage device 207 may comprise a hard drive or other mass storage device providing storage for programs not in use or for other data generated or used in the course of gaming machine operation. Network controller 210 provides an interface to other components of a gaming system in which gaming machine 100 is included. In particular, network controller 210 provides an interface to a game controller which controls certain aspects of the player selection round as will be discussed below in connection with FIGS. 3A-B.

It should be noted that the invention is not limited to gaming machines employing the personal computer-type arrangement of processing devices and interfaces shown in example gaming machine 100. Other gaming machines through which a persistent indicia player selection round is implemented may include one or more special purpose processing devices to perform the various processing steps for implementing the present invention. Unlike general purpose processing devices such as CPU 205, these special purpose processing devices may not employ operational program code to direct the various processing steps.

It should also be noted that the invention is not limited to gaming machines including only video display devices for conveying results. It is possible to implement the base game within the scope of the present invention using an electro mechanical arrangement or even a purely mechanical arrangement for displaying the symbols needed to complete the game as described herein. However, the most preferred forms of the invention utilize one or more video display devices for displaying the spinning reels, the accumulated symbols, and the persistent indicia feature. For example, a gaming machine suitable for providing a player selection round may include a mechanical reel-type display rather than a video-type display device for displaying results in a primary game, and include a video display device for presenting the player selection round as a bonus game.

Still referring to the hardware and logical block diagram 200 showing an example design for a gaming machine 100, the depicted machine in operation is controlled generally by CPU 205 which stores operating programs and data in memory 207 with wagering game 204, user interface 220, network controller 210, audio/visual controllers, and reel assembly 213 (if a mechanical reel configuration). CPU or game processor 205 may comprise a conventional microprocessor, such as an Intel® Pentium® microprocessor, mounted on a printed circuit board with supporting ports, drivers, memory, software, and firmware to communicate with and control gaming machine operations, such as through the execution of coding stored in memory 207 including one or more wagering games 204. Game processor 205 connects to user interface 220 such that a player may enter input information and game processor 205 may respond according to its programming, such as to apply a wager and initiate execution of a game.

Figure 4A:
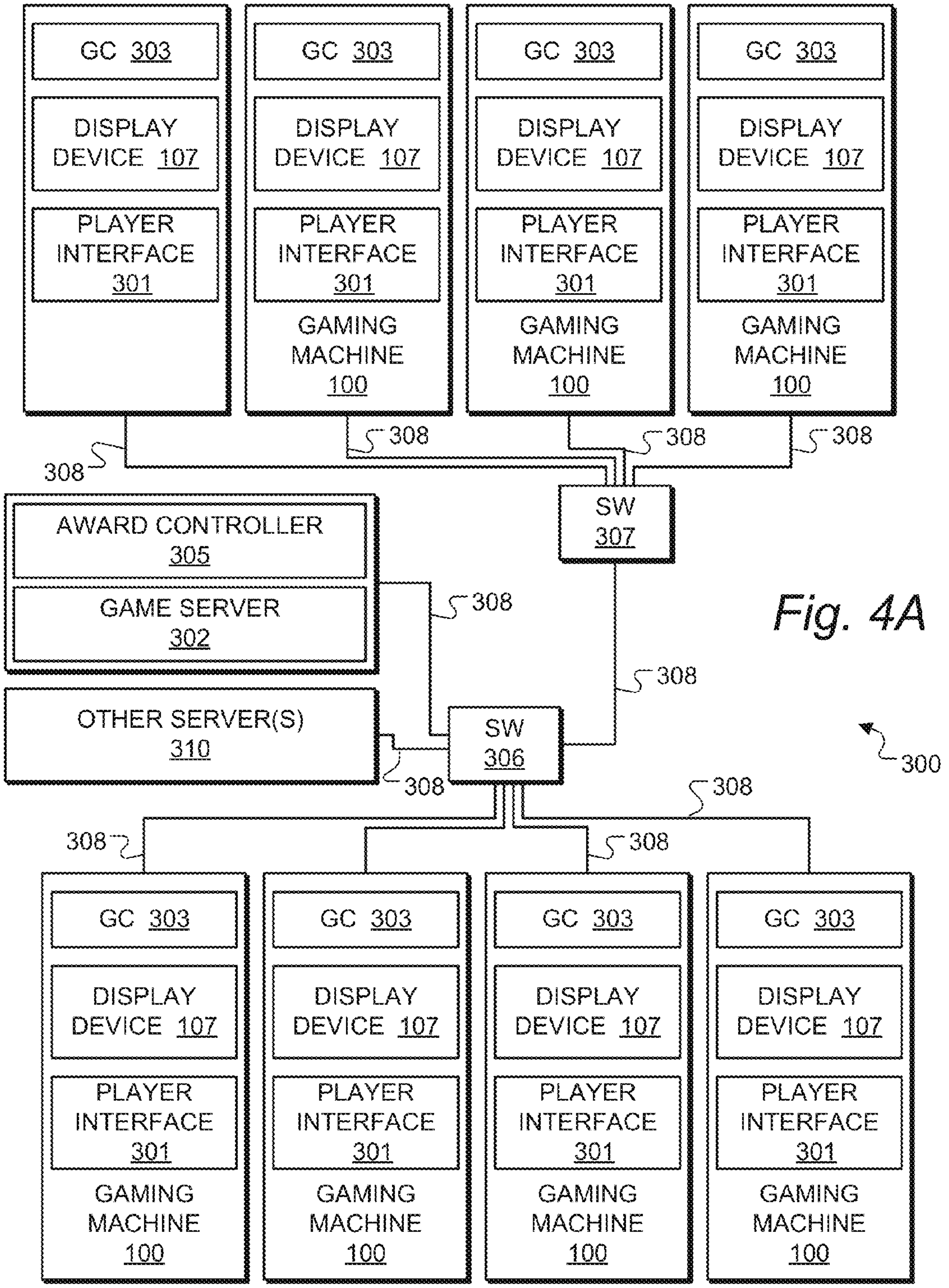
FIG. 4A is a system block diagram of a gaming system according to one embodiment of the present invention.
Figure 4B:
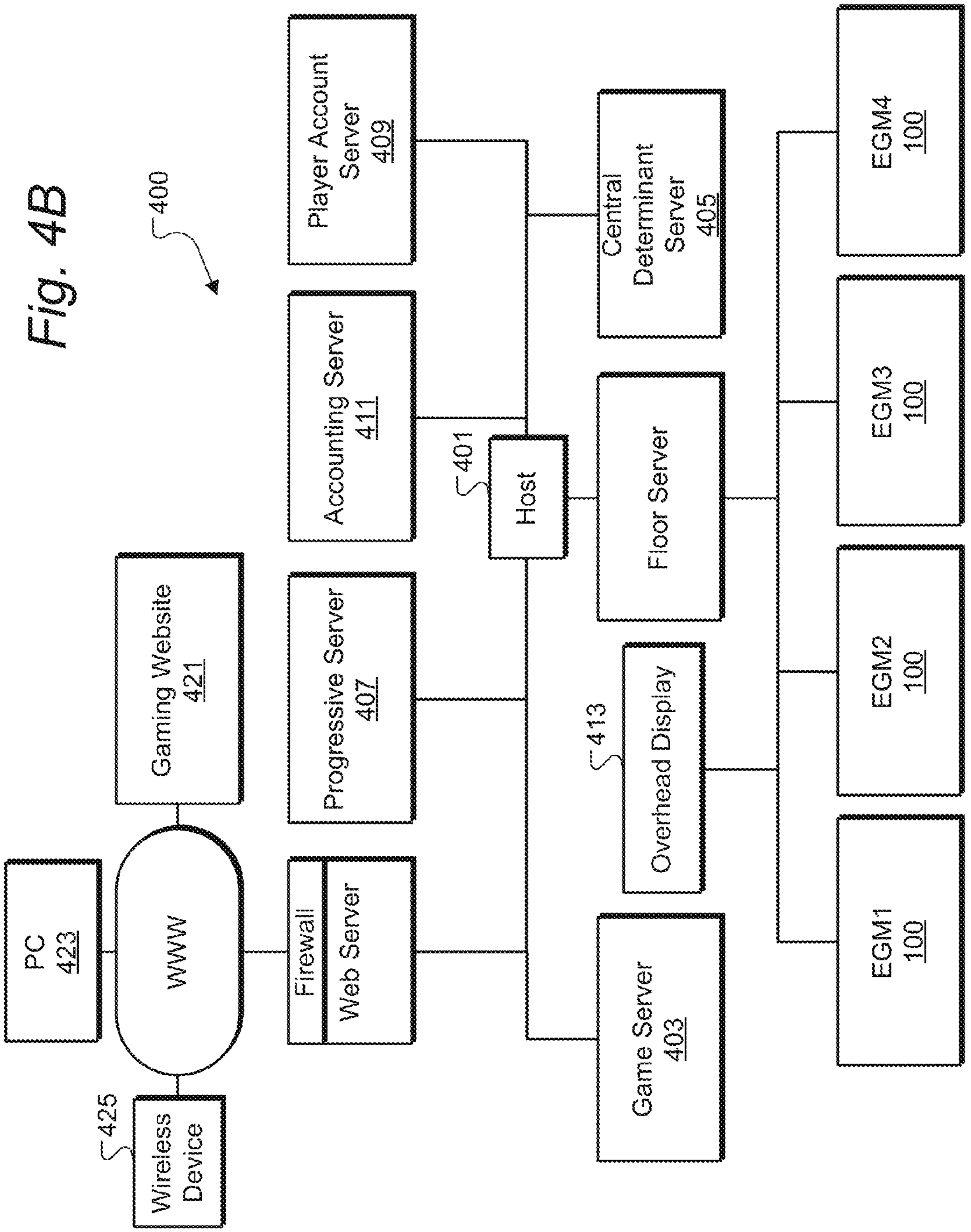
FIG. 4B is a system block diagram of a gaming system according to another embodiment.

Game processor 205 also may connect through network controller 210 to a gaming network, such as example casino server network 400 shown in FIG. 4B. Referring now to FIG. 4B, the casino server network 400 may be implemented over one or more site locations and include host server 401, remote game play server 403 (which may be configured to provide game processor functionality including determining game outcomes and providing audio/visual instructions to a remote gaming device), central determinant server 405 (which may be configured to determine lottery, bingo, or other centrally determined game outcomes and provide the information to networked gaming machines 100 providing lottery and bingo-based wagering games to patrons), progressive server 407 (which may be configured to accumulate a progressive pool from a portion of wagering proceeds or operator marketing funds and to award progressive awards upon the occurrence of a progressive award winning event to one or more networked gaming machines 100), player account server 409 (which may be configured to collect and store player information and/or awards and to provide player information to gaming machines 100 after receiving player identification information such as from a player card), and accounting server 411 (which may be configured to receive and store data from networked gaming machines 100 and to use the data to provide reports and analyses to an operator). Through its network connection, gaming machine 100 may be monitored by an operator through one or more servers such as to assure proper operation, and, data and information may be shared between gaming machine 100 and respective of the servers in the network such as to accumulate or provide player promotional value, to provide server-based games, or to pay server-based awards.

Referring now to FIG. 4A, a gaming system 300 according to another embodiment of the present invention is shown again in a network and system diagram format. System 300 includes a number of gaming machines, each comprising a gaming machine 100 in this example implementation. For purposes of describing system 300, each gaming machine 100 in FIG. 4A is shown as including a video display device 107 and a player interface that may include buttons, switches, or other physical controls and/or touch screen controls as discussed above in connection with FIG. 4A. This player interface is labeled 301 in FIG. 4A. System 300 further includes a game server 302 and a respective game client 303 (abbreviated "GC" in FIG. 4A) included with each respective gaming machine 100. In the form of the invention shown in FIG. 4A these two components, game server 302 and the game client components 303 combine to implement a game control arrangement which will be described in detail below. System 300 also includes an award controller 305, which is shown in FIG. 4A as being associated with game server 302 to indicate that the two components may be implemented through a common data processing device/computer system. Gaming machines 100, game server 302, and award controller 305 are connected in a network communication arrangement including first and second network switches 306 and 307, connected together through various wired or wireless signal paths, all shown as communications links 308 in FIG. 4A.

Each gaming machine 100, and particularly player interface 301 associated with each gaming machine, allows a player to make any inputs that may be required to make the respective gaming machine eligible for the game, and make selections of selectable objects displayed at the respective gaming machine in the course of the player selection round. Player interface 301 also allows a player at the gaming machine to initiate plays in a primary game available through the gaming machine in some implementations. The respective video display device 107 associated with each respective gaming machine 100 is used according to the invention to generate the graphic displays to show the various elements of a player selection round at the respective gaming machine.

The game control arrangement made up of game server 302 and the respective game client 303 at a given gaming machine functions to control the respective video display device 107 for that gaming machine to display the selectable objects. Award controller 305 is responsible for awarding prizes for a player's participation, and maintaining progressive prize information where the game offers one or more progressive prizes. The network arrangement made up of network switches 306 and 307, and the various communication links 308 shown in FIG. 4A is illustrated merely as an example of a suitable communications arrangement. It should be noted that the game control arrangement, or as it is referred to generally the "game controller," may be implemented in some embodiments entirely on the gaming machine. This is especially true in jurisdictions that allow Class III gaming conducted with random number generators at each gaming machine. The present invention is not limited to any particular communications arrangement for facilitating communications between game server 302 and various gaming machines 100. Any wired or wireless communication arrangement employing any suitable communications protocols (such as TCP/IP for example) may be used in an apparatus according to the invention.

FIG. 4A shows other server(s) 310 included in the network. This illustrated "other server(s)" element 310 may include one or more data processing devices for performing various functions related to games conducted through system 300 and any other games that may be available to players through gaming machines 100. For example, apparatus 300 may be accounting servers providing support for cashless gaming or various forms of mixed cash/cashless gaming through the various gaming machines 100. In this example, an additional one of the other servers 310 will be included in apparatus 300 for supporting these types of wagering and payout systems. As another example, the various gaming machines 100 included in system 300 may allow players to participate in a game (primary game) other than the game described herein, and this other game may rely on a result identified at or in cooperation with a device that is remote from the gaming machines. In this example, another server 310 may be included in the system for identifying results for the primary game and communicating those results to the various gaming machines 100 as necessary. Generally, the other server(s) 310 shown in FIG. 4A are shown only to indicate that numerous other components may be included along with the elements that participate in providing persistent indicia features according to the present invention. Other server(s) 310 may provide record keeping, player tracking, accounting, result identifying services, or any other services that may be useful or necessary in a gaming system.

Referring to FIG. 4B, a block diagram of another example networked gaming system 400 associated with one or more gaming facilities is shown, including one or more networked gaming machines 100 in accordance with one or more embodiments. With reference to FIG. 4B, while a few servers have been shown separately, they may be combined or split into additional servers having additional capabilities.

As shown, networked gaming machines 100 (EGM1-EGM4) and one or more overhead displays 413 may be network connected and enable the content of one or more displays of gaming machines 100 to be mirrored or replayed on an overhead display. For example, the primary display content may be stored by the display controller or game processor 205 and transmitted through network controller 210 to the overhead display controller either substantially simultaneously or at a subsequent time according to either periodic programming executed by game processor 205 or a triggering event, such as a jackpot or large win, at a respective gaming machine 100. In the event that gaming machines 100 have cameras installed, the respective players' video images may be displayed on overhead display 413 along with the content of the player's display 100 and any associated audio feed.

In one or more embodiments, game server 403 may provide server-based games and/or game services to network connected gaming devices, such as gaming machines 100 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Accounting server 411 may receive gaming data from each of the networked gaming devices, perform audit functions, and provide data for analysis programs, such as the IGT Mariposa program bundle.

Player account server 409 may maintain player account records, and store persistent player data such as accumulated player points and/or player preferences (e.g. game personalizing selections or options). For example, the player tracking display may be programmed to display a player menu that may include a choice of personalized gaming selections that may be applied to a gaming machine 100 being played by the player.

In one or more embodiments, the player menu may be programmed to display after a player inserts a player card into the card reader. When the card reader is inserted, an identification may be read from the card and transmitted to player account server 409. Player account server 409 transmits player information through network controller 210 to user interface 220 for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor 205 for storing and use during the player's game play. Also, the player's selection may be transmitted to player account server 409 where it may be stored in association with the player's account for transmission to the player in future gaming sessions. The player may change selections at any time using the player tracking display (which may be touch sensitive or have player-selectable buttons associated with the various display selections).

In one or more embodiments, a gaming website may be accessible by players, e.g. gaming website 421, whereon one or more games may be displayed as described herein and played by a player such as through the use of personal computer 423 or handheld wireless device 425 (e.g. Blackberry® cell phone, Apple® iPhone®, personal data assistant (PDA), iPad®, etc.). To enter the website, a player may log in with a username (that may be associated with the player's account information stored on player account server 409 or be accessible by a casino operator to obtain player data and provide promotional offers), play various games on the website, make various personalizing selections, and save the information, so that during a next gaming session at a casino establishment, the player's playing data and personalized information may be associated with the player's account and accessible at the player's selected gaming machine 100.

Any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

Further, as described herein, the various features have been provided in the context of various described embodiments, but may be used in other embodiments. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method of providing a wagering game on a gaming machine having a display, a wager input device, and at least one electronic controller operatively coupled to the wager input device and the display and configured to execute instructions related to the wagering game, the method comprising:

receiving a wager from a player at the wager input device, receiving a game activation at the gaming machine, and in response initiating the wagering game;

detecting the presence of a player pick activation in the game, and in response displaying on the electronic display a set of player selectable indicia and providing the player ability to make multiple selections from the set of player selectable indicia;

in response to player selection of a pick prize type indicia, awarding a pick prize; and in response to player selection of a persistent indicia:

(i) awarding a pick prize;

(ii) displaying a persistent effect indicator meaning that a persistent effect occurs; and (iii) adding a secondary prize to pick prizes awarded for future selections in the multiple selections.

2. The method of claim 1, further comprising displaying an animation that the secondary prize is a result of the persistent effect indicator.

3. The method of claim 2, in which the wagering game includes multiple persistent indicia in the set of player selectable indicia, and wherein if the player selects multiple persistent indicia, each one provides a separate persistent effect in the player selection round.

4. The method of claim 3, wherein each of the multiple persistent indicia causes a separate persistent effect indicator to be displayed.

5. The method of claim 2, wherein the secondary prize varies in amount for each selection in which it is provided in response to a player selection, and further wherein the amount of each secondary prize is randomly selected.

6. The method of claim 1, wherein the player selection round includes multiple types of persistent indicia with different effects, and wherein a second type of persistent indicia has the effect of displaying its persistent effect indicator until the end of the multiple player selections, and awarding an independent secondary prize after the multiple player selections.

7. The method of claim 1, further comprising ending the multiple player selections after showing a predetermined number of escalating ending events shown after the player selections at random intervals in the player selection round.

8. The method of claim 7, wherein the player selection round includes multiple types of persistent indicia with different effects, and further wherein a third type is provided that has the effect of displaying its persistent effect indicator for a number of player selections before it expires, the persistent effect indicator having the effect of preventing any escalating ending events from occurring before it expires.

9. A system for providing a wagering game for a player, the system comprising an electronic gaming machine interacting with at least one server, a display, a wager input device, and at least one electronic controller operatively coupled to the wager input device and the display and configured to execute instructions related to the wagering game, the system programmed for:

receiving a wager from a player at the wager input device, receiving a game activation at the gaming machine, and in response initiating the wagering game;

detecting the presence of a player pick activation in the game, and in response displaying on the electronic display a set of player selectable indicia and providing the player ability to make multiple selections from the set of player selectable indicia;

in response to player selection of a pick prize type indicia, awarding a pick prize;

in response to player selection of a persistent indicia:

(i) awarding a pick prize;

(ii) displaying a persistent effect indicator meaning that a persistent effect occurs; and (iii) adding a secondary prize to pick prizes awarded for future selections in the multiple selections.

10. The system of claim 9, further programmed for displaying an animation that the secondary prize is a result of the persistent effect indicator.

11. The system of claim 10, in which the wagering games includes multiple persistent indicia in the set of player selectable indicia, and wherein if the player selects multiple persistent indicia, each one provides a separate persistent effect in the player selection round.

12. The system of claim 10, wherein the secondary prize varies in amount for each selection in which it is added to a pick prize, and further wherein the amount of each secondary prize is randomly selected.

13. The system of claim 9, wherein the player selection round includes multiple types of persistent indicia with different effects, and wherein a second type of persistent indicia has the effect of displaying its persistent effect indicator until the end of the multiple player selections, and awarding an independent secondary prize ager the multiple player selections.

14. The system of claim 9, further programmed for ending the multiple player selections after showing a predetermined number of escalating ending events shown after the player selections at random intervals in the player selection round.

15. The system of claim 14, wherein the player selection round includes multiple types of persistent indicia with different effects, and further wherein a third type is provided that has the effect of displaying its persistent effect indicator for a number of player selections before it expires, the persistent effect indicator having the effect of preventing any escalating ending events from occurring before it expires.

16. A method of providing a wagering game on a gaming machine having a display, a wager input device, and at least one electronic controller operatively coupled to the wager input device and the display and configured to execute instructions related to the wagering game, the method comprising:

receiving a wager from a player at the wager input device, receiving a game activation at the gaming machine, and in response initiating the wagering game;

detecting the presence of a player pick activation in the game, and in response displaying on the electronic display a set of player selectable indicia and providing the player ability to make multiple selections from the set of player selectable indicia;

in response to player selection of a pick prize type indicia, awarding a pick prize;

ending the multiple player selections after showing a predetermined number of escalating ending events shown after the player selections at random intervals in the player selection round; and wherein the player selection round includes multiple types of persistent indicia with different effects, and further wherein a type of persistent indicia is provided that has the effect displaying a persistent effect indicator for a number of player selections before it expires, the persistent effect indicator having the effect of preventing any escalating ending events from occurring before it expires.

17. The method of claim 16, further comprising in response to a player selection of a second type of persistent indicia:

(i) displaying a second type of persistent effect indicator meaning that a persistent indicia is saved to be activated at the end of the multiple selections; and (ii) activating the second persistent indicia after the end of the multiple selections in response to the end of the multiple selections, thereby showing an animation associated with the second persistent indicia and awarding an additional prize associated therewith.

18. The method of claim 16, further comprising, in response to player selection of a first type of persistent indicia:

(i) awarding a pick prize;

(ii) displaying a first type of persistent effect indicator meaning that a persistent secondary prize effect occurs; and (iii) adding a secondary prize to pick prizes awarded for future selections in the multiple selections.

* * * * *